United States Patent [19]
Barber, III

[11] Patent Number: 5,569,331
[45] Date of Patent: Oct. 29, 1996

[54] METHOD AND APPARATUS FOR RECYCLING OIL-SOAKED BOOM AND PADS

[76] Inventor: John Barber, III, 9446 Lechner Rd., Fort Worth, Tex. 76179

[21] Appl. No.: 369,883

[22] Filed: Jan. 6, 1995

[51] Int. Cl.$^6$ .............................. B08B 7/00; E02B 15/04; B01D 17/00
[52] U.S. Cl. ........................... 134/40; 208/305; 210/924; 422/268; 422/269; 422/271; 422/272; 422/273; 422/274; 422/276; 422/280; 405/63
[58] Field of Search ............................ 134/40; 208/305; 210/924, 923; 502/22; 422/268, 269, 271, 272, 273, 274, 276, 280; 405/63

[56] References Cited

U.S. PATENT DOCUMENTS

| | | | |
|---|---|---|---|
| 4,018,567 | 4/1977 | La Point | 422/269 |
| 4,882,021 | 11/1989 | Barnhart | 204/157.55 |
| 5,165,821 | 11/1992 | Fischer et al. | 405/63 |
| 5,192,455 | 3/1993 | Marcel, Jr. | 210/787 |
| 5,197,678 | 3/1993 | Trezek et al. | 241/21 |
| 5,244,566 | 9/1993 | Bond | 208/180 |
| 5,262,048 | 11/1993 | Zimmerman et al. | 210/232 |
| 5,312,754 | 5/1994 | Bryan-Brown | 435/290 |

Primary Examiner—N. Bhat
Attorney, Agent, or Firm—James E. Bradley; Mark W. Handley

[57] ABSTRACT

A method and apparatus are provided for removing oil from absorbent materials of the type used in components for absorbing oil and containing oil spills. The components are first passed through a press to squeeze some of the oil from the components. The components are then shredded to separate the components into separate pieces of the absorbent materials. An auger pushes the pieces of absorbent materials into an elongated tubular trommel having a perforated sidewall. The pieces of absorbent materials are sprayed with treatment fluids as the trommel is rotated to tumble the absorbent materials within the trommel. The oil and treatment fluids drain from the absorbent materials, and pass through the perforations in the trommel sidewalls and onto a collection trough. The collection trough directs the oil and treatment fluids through a separator to reclaim treatment fluids and oil for later use. The absorbent materials within the trommel continue to be tumbled as they pass through a drying section in which hot air from a furnace is blown through the pieces of the absorbent materials. The absorbent materials then pass to a repacking section where they are repackaged into components for use in absorbing oil and containing oil spills.

20 Claims, 2 Drawing Sheets

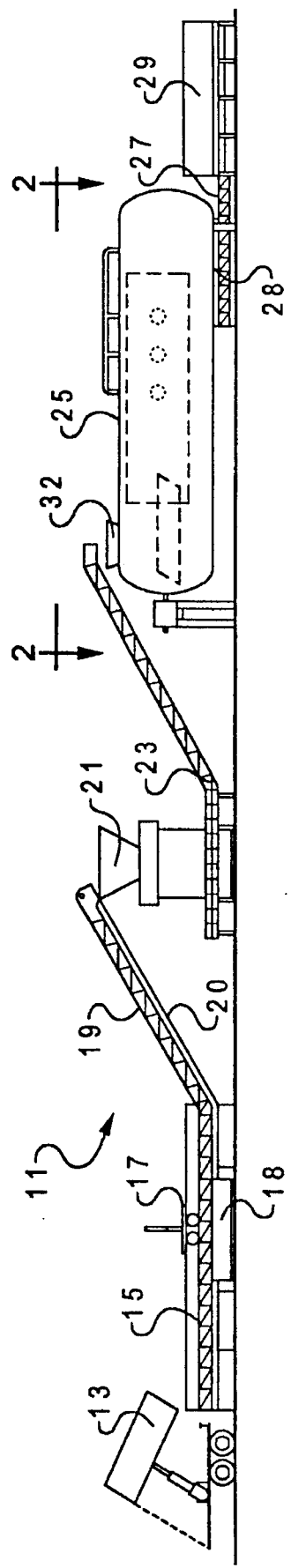
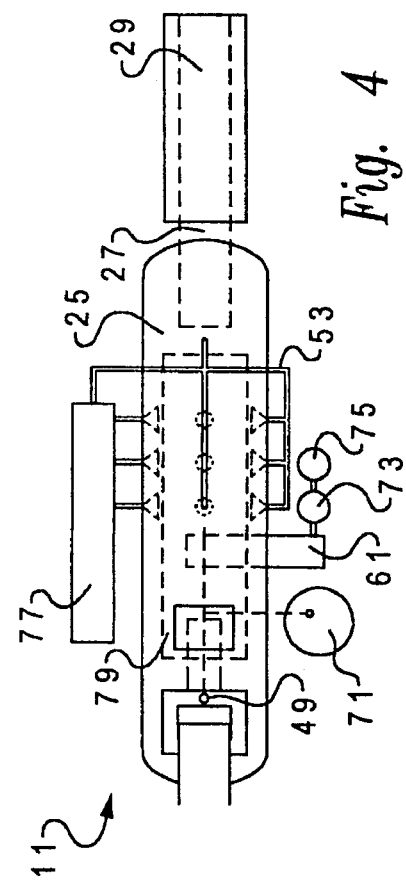
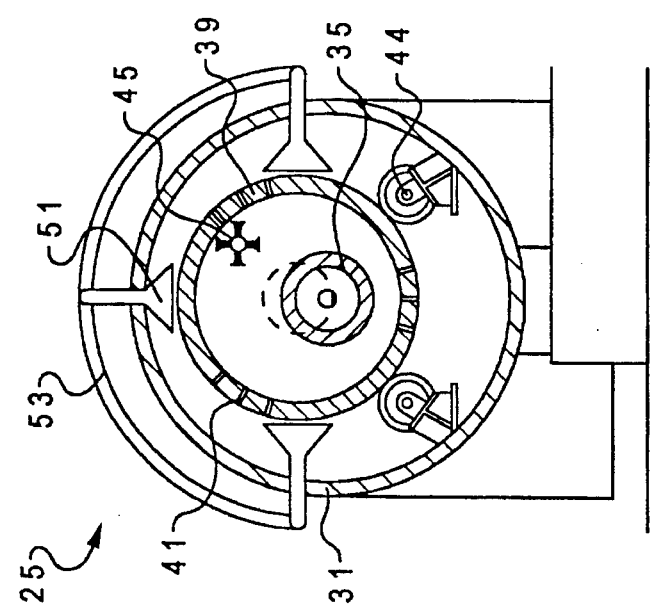
Fig. 1
Fig. 3
Fig. 4

5,569,331

METHOD AND APPARATUS FOR RECYCLING OIL-SOAKED BOOM AND PADS

BACKGROUND OF THE INVENTION

1. Field of the Invention

This invention relates in general to recycling used materials, and in particular to a method and apparatus for recycling oil-soaked absorbent materials used in booms and pads.

2. Description of the Prior Art:

Booms and pads are generally absorbent components which are used for containing oil spills. Booms are generally sausage-shaped components having an outer skin made of a porous material and an interior made from absorbent materials. The interior absorbent materials are typically fibrous materials, such as a polyester and cotton. Pads are generally thinner, and may be formed similar to blankets. Pads are usually laid on top of pools of oil for absorbing the oil. Booms are used for both absorbing oil and containing the spread of oil.

During use to contain oil spills, booms and pads become soaked with oil. Special precautions must be taken prior to disposing of used booms and pads. Environmental concerns require that booms and pads not be disposed of in such a way that ground and surface waters could become contaminated. Prior art methods for cleaning oil-soaked booms and pads primarily consist of soaking the booms and pads within solvents.

SUMMARY OF THE INVENTION

A method and apparatus are provided for removing oil from absorbent materials of the type used in components for absorbing oil and containing oil spills. The components are first passed through a press to squeeze some of the oil from the components. The components are then shredded to separate the components into separate pieces of the absorbent materials. An auger pushes the pieces of absorbent materials into an elongated tubular trommel having a perforated sidewall. The pieces of absorbent materials are sprayed with treatment fluids as the trommel is rotated to tumble the absorbent materials within the trommel. The oil and treatment fluids drain from the absorbent materials, and pass through the perforations in the trommel sidewalls and onto a collection trough. The collection trough directs the oil and treatment fluids through a separator to reclaim treatment fluids and oil for later use. The absorbent materials within the trommel continue to be tumbled as they pass through a drying section in which hot air from a furnace is blown through the pieces of the absorbent materials. The absorbent materials then pass to a repacking section where they are repackaged into components for use in absorbing oil and containing oil spills.

BRIEF DESCRIPTION OF THE DRAWINGS

FIG. 1 is a side elevational view of a processing line according to the present invention for cleaning oil from the absorbent materials used in booms and pads;

FIG. 3 is a sectional view of the schematic diagram of FIG. 2, taken along section line 3—3; and FIG. 4 is a top view of a rearward portion of the processing line of FIG. 1.

DETAILED DESCRIPTION OF THE INVENTION

Figure 2:
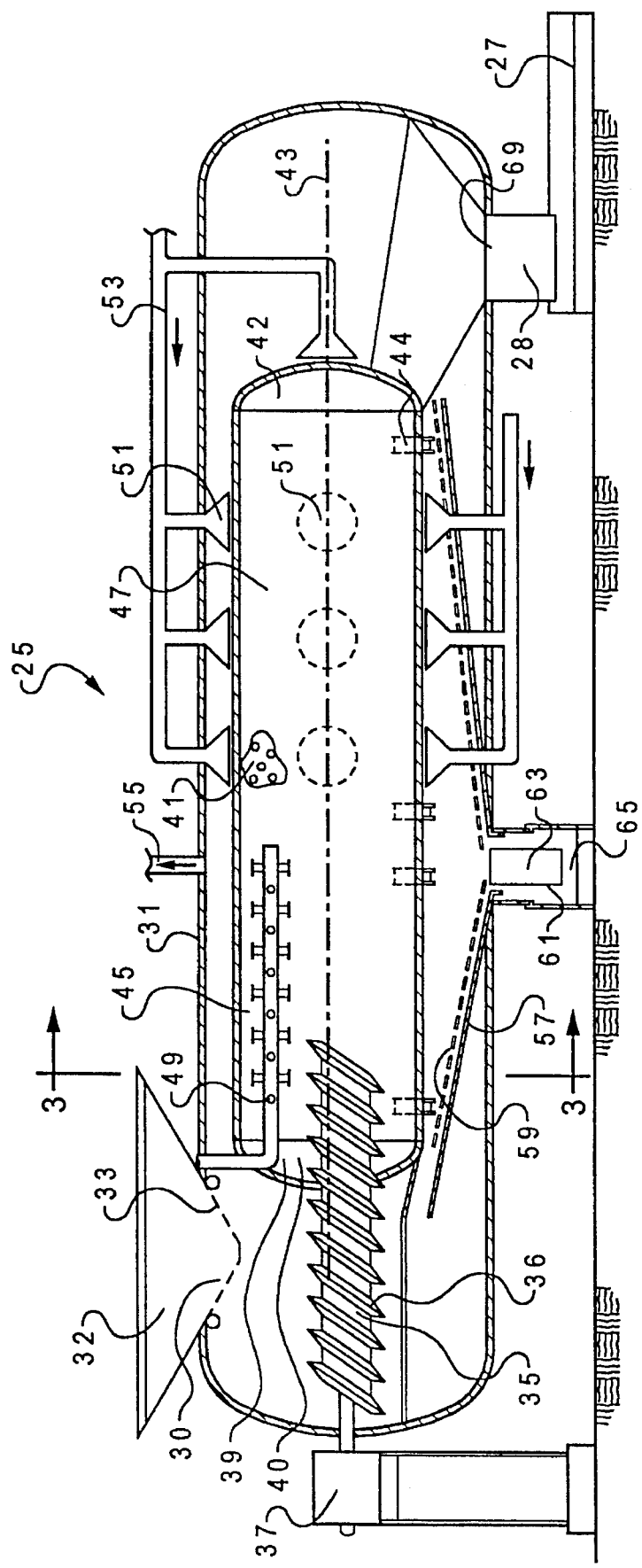
FIG. 2 is a longitudinal section view which schematically depicts a processing tank according to the present invention, taken along section line 2—2 of FIG. 1.

FIG. 1 is a side elevational view which schematically depicts processing line 11 for cleaning oil-soaked booms and pads. Transport vehicle 13 is shown disposed aside of conveyer 15 for dumping used, oil-soaked booms and pads into processing line 11. Conveyer 15 provides a conveyance means for transporting the booms and pads to press 17. Booms and pads are squeezed within press 17 to press the oil from the absorbent materials within the booms and pads. Collector pan 18 extends beneath press 17 to provide a collection means for collecting the oil which drips from press 17.

Conveyer 19 extends from press 17. Collector pan 20 extends beneath conveyer 19 to provide a collection means for collecting and containing oil drippings. Booms and pads are transported to shredder 21, which shreds the booms and pads into separate pieces of the absorbent materials contained within the booms and pads. Conveyer 23 then provides a conveyance means for transporting the shredded materials to processing tank 25.

Processing tank 25 is a batch processing tank within which the absorbent materials are cleaned to remove oil therefrom. Conveyor 27 extends from discharge 28 of processing tank 25, and transports the absorbent materials to repacking table 29. The absorbent materials are then packaged into new booms and pads for reuse in absorbing and collecting spilled oil.

FIG. 2 is a longitudinal section view which schematically depicts processing tank 25 according to the present invention, taken along section line 2—2 of FIG. 1. Processing tank 25 includes housing 31. In the preferred embodiment of the present invention, housing 31 is a cylindrical, high pressure vessel which has a diameter of eight feet and a length of forty feet.

Hopper 32 extends through primary inlet port 30 of housing 31 and includes gates 33 to control discharge of absorbent materials from hopper 32 and into housing 31. Gates 33 also prevent release of pressure from within housing 31 when a batch of absorbent materials is being cleaned within processing tank 25. Hopper 32 is provided for receiving shredded absorbent materials from conveyor 23 (FIG. 1), and is preferably sized to hold from two to four cubic yards of absorbent materials.

Auger 35 extends within housing 31 beneath hopper 32 for receiving absorbent materials which pass through hopper 32. Auger 35 includes circumferentially extending auger blades 36 which spiral around a central body for auger 35. Motor 37 provides a drive means for rotating auger 35 to push absorbent materials into trommel 39. Auger 35 is preferably rotated at fewer revolutions per minute than trommel 39.

Trommel 39 is an elongated tubular member having a cylindrical shape defined by a continuous, perforated outer sidewall 41. Trommel 39 is made from steel, and has an open upstream, or forward, end 40 and an open downstream, or rearward, end 42. Trommel 39 includes central longitudinal axis 43 which extends through a central portion of trommel 39, and in the preferred embodiment of the present invention defines a center line for the cylindrical shape of trommel 39. Trommel 39 is preferably canted with a slight downward slope in a rearward direction, extending away from auger 35.

The downward cant of trommel 39 in a rearward direction is adjustable.

Wheels 44 rotatably support trommel 39 within housing 31, and at least part of wheels 44 are connected to a drive motor to provide a drive means for rotating trommel 39. Trommel 39 is continuously rotated about longitudinal axis 43 to tumble the shredded pieces of absorbent materials within trommel 39. The continuous rotation and the downward cant in a rearward direction of trommel 39 together provide a means for moving the absorbent materials through trommel 39. The downward cant in a rearward direction for trommel 39 is adjustable to select the rate at which absorbent materials move through trommel 39, and to adjust trommel 39 for passing and cleaning different weights of absorbent materials.

Processing tank 25 includes a wash section 45 and a drying section 47 within which the shredded pieces of absorbent materials are sequentially washed and then dried as they are tumbled within trommel 39. Wash section 45 includes spray heads 49 which extend into an upper portion of the forward wash section of trommel 39. Spray heads 49 include chemical treatment nozzles for spraying the absorbent materials with treatment fluids. In the preferred embodiment of the present invention, treatment chemicals, such as a biodegradable solvent, are mixed with steam to provide the treatment fluids.

Hot air nozzles 51 extend within drying section 47 of housing 31 for blowing forced air from piping manifold 53 and through the sidewall 41 of trommel 39. The hot air is passed through the perforations in sidewall 41 to dry the absorbent materials which are tumbled within trommel 39. Hot air is preferably provided by a gas fired furnace.

Vent stack 55 extends through housing 31 to collection tank 61 for venting the hot air and steam which are sequentially passed into housing 31 from nozzles 51 and spray heads 49, respectively. The hot air and steam from vent stack 55 are reheated for passing back through either piping manifold 53, or for mixing with treatment chemicals for passing through spray heads 49, respectively. Since spray heads 49 and hot air nozzles 51 are sequentially operated, vent stack 55 is ported accordingly to route either the steam for reheating and passing back through spray heads 49, or the hot air for reheating and passing back through hot air nozzles 51. Vent stack 55 also provides pressure relief for the interior of housing 31.

Collection trough 57 extends beneath trommel 39 for collecting oil and treatment fluids which pass through the perforations in sidewall 41 of trommel 39. Perforated panel 59 extends above collection trough 57 and beneath trommel 39 with perforations that are smaller than the perforations in trommel 39. Perforated panel 59 passes oil and treatment fluids which drain from trommel 39, yet prevents small pieces of the absorbent materials, such as fluff, and other particulate matter from passing downward and directly onto collection trough 57. Thus, liquids are separated from solid particulate matter which is too large to pass through the perforations in the panel 59.

It should be noted that virtually all of the absorbent materials will remain within trommel 39 and will not pass through the perforations in sidewall 41. Only a very small portion of the absorbent materials will pass through the perforations in sidewall 41 and onto perforated panel 59. The drained fluids, small pieces of absorbent materials and other particulate matter which pass through the perforations in sidewall 41 and drain onto trough 57 and perforated panel 59 then pass from collection trough 57 and perforated panel 59 into collection tank 61.

Collection tank 61 has an inner tank 63 for receiving the small pieces of absorbent materials and other particulate matter which are too large to pass through the perforations in panel 59. Collection tank 61 further includes outer tank 65 for receiving the liquids which pass through the perforations in panel 59 and drain from collection trough 57. Perforated panel 59 and collection tank 61 form part of a separation means for separating the small pieces of absorbent materials from oil and treatment fluids. The small pieces of absorbent materials which collect in tank 61 may be placed back into trommel 39 for further processing. Oil is later separated from treatment fluids, such as the water condensed from steam, in separator 73 (shown in FIG. 4).

The absorbent materials which remain within trommel 39 are sequentially washed and then dried. Canting and continuous rotation of trommel 39 cause tumbling of the absorbent materials and the absorbent materials to move toward discharge 42 of trommel 39. The absorbent materials are then passed through downstream end 42 of trommel 39 and out of tank 25 through primary discharge port 69 of housing 31. Discharge 28 of processing tank 25 extends from housing 31 above conveyor 27. Discharge 28 preferably has a discharge door which can be closed to seal pressure within housing 31 as a batch of absorbent materials is being cleaned. Conveyor 27 extends beneath discharge 28 for conveying the absorbent materials to repacking table 29 (shown in FIG. 1).

FIG. 3 is a sectional view taken along section line 3—3 of FIG. 2, and schematically depicts processing tank 25. Housing 31 and trommel 39 are concentrically disposed. Auger 35 is concentrically disposed within housing 31 and trommel 39. Rollers 44 rotatably secure trommel 39 within housing 31. Piping 53 extends into housing 31 and hot air nozzles 51 are exteriorly disposed around trommel 39 in close proximity to perforated sidewall 41. Spray header 49 extends interiorly within an upper portion of the central region of trommel 39.

FIG. 4 is a top view which schematically depicts a portion of processing line 11. Chemical storage tank 71 provides treatment chemicals for mixing with steam to provide treatment fluids for passing through spray heads 49 into processing tank 25. Collection tank 61 passes collected fluids to separator 73. Separator 73 is provided for separating the collected fluids into oil and treatment fluids. The drained treatment fluids are primarily water which has condensed from steam. Oil and treatment fluids are separately passed to separate storage tanks. The oil is passed to storage tank 75, and the treatment fluids are passed to either storage tank 71 or back to a furnace to provide steam for passing through spry nozzles 49.

A single gas fired furnace 77 provides forced air. The forced air is passed from furnace 77, through piping 53, and into processing tank 25. Furnace 77 is also used for the heating steam which is mixed with treatment chemicals to provide treatment fluids for passing through spray header 49.

Referring to FIG. 1, in operation, oil-soaked booms and pads are dumped into processing line 11 by transport vehicle 13. After being dumped onto conveyor 15, the soiled booms and pads pass through press 17. Press 17 squeezes a first portion of the oil from the absorbent materials within the booms and pads. The booms and pads are then passed to conveyor 19. Collection pans 18, 20 are provided for collecting the oil which drains from the booms and pads passing through the press 17 and conveyor 19.

Conveyor 19 transports the booms and pads to shredder 21. Shredder 21 shreds the component booms and pads into separate pieces of the absorbent materials. It should be noted that a collection, or drain pin, should also be provided beneath the shredder 21 and conveyor 23 for containing oil. Conveyor 23 then transports the booms and pads to hopper 32 in the top, forward portion of processing tank 25.

Referring to FIG. 2, the absorbent materials then pass from hopper 32, into housing 31 and onto auger 35. Preferably about two to four cubic yards of oil-soaked materials are batch processed within processing tank 25 at one time. Blades 36 of auger 35 rotate and push the shredded pieces of absorbent materials into trommel 39. Treatment chemicals from storage tank 71 are mixed with steam to provide treatment fluids for passing through piping 79 (shown in FIG. 4) and into spray heads 49. Treatment fluids are sprayed onto the absorbent materials tumbling within trommel 39 to clean oil from the absorbent materials.

Treatment fluids and oil removed from the absorbent materials then pass through perforations in trommel 39 and onto perforated plate 59. Perforated panel 59 separates smaller pieces of particulate matter from fluids. Treatment fluids and oil pass through the perforated plate and onto collection trough 57. A very small amount of the absorbent materials may pass onto perforated panel 59. This very small amount of absorbent materials, along with other particulate matter and the drained treatment fluids, are collected within collection tank 61.

Rather than passing through the perforations in sidewall 41, virtually all of the absorbent materials continue to tumble within trommel 39 as trommel 39 is continuously rotated. Rotation and canting of trommel 39 together slowly pass the absorbent materials within trommel 39 from washing section 45 to drying section 49. After the spraying of treatment fluids through spray header 49 is discontinued, then hot air from furnace 77 is blown into trommel 39. The hot air passes through piping 53 and from nozzle 51 into drying section 49, and then through the perforations in sidewall 41 of trommel 39. The hot air passes through the pieces of absorbent materials which are tumbling within trommel 39 to evaporate treatment fluids and dry the absorbent materials.

After drying, the pieces of absorbent materials pass through trommel discharge 42, through processing tank discharge 28 and onto conveyor 27 for passing to repacking table 29 (shown in FIG. 1). The cleaned absorbent materials are repackaged into new booms and pads on repacking table 29. Repackaging may be accomplished by automated equipment, or by manual packing means. The pieces of absorbent materials may be further dried on conveyor 27 and repacking table 29.

It should be noted that more than one processing line may be provided with components shared between the processing lines. For example, two separate processing lines may share a single gas fired furnace for generating steam and hot air. Other components within the processing lines may also be shared. Further, other embodiments of the present invention may provide for continuous processing rather than batch processing.

The present invention provides several advantages over the prior art. A method and apparatus are provided for economically and efficiently cleaning booms and pads so that they may be reused for absorbing oil and containing oil spills. Costly expenses for the disposal and replacement of oil-soaked booms and pads are avoided. Treatment fluids and oil are also reclaimed for further use.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

I claim:

1. A method for removing oil from absorbent materials of the type used in absorbent components for absorbing oil and containing oil spills, the method comprising the steps of:

providing a trommel having a forward end, a rearward end, and a perforated wall defining an exterior for the trommel, the trommel further having a central axis which extends through a central portion of the trommel, wherein the trommel is rotatably mounted for rotating about the central axis;

shredding absorbent components into pieces of the absorbent materials prior to feeding the absorbent materials through the forward end of the trommel;

feeding the absorbent materials through the forward end of the trommel and into the trommel;

rotating the trommel about the central axis and tumbling the absorbent materials within the central portion of the trommel;

spraying treatment fluids on the absorbent materials while in the trommel;

collecting the treatment fluids and the oil which pass through the perforated wall of the trommel and drain beneath the trommel;

blowing heated air on the absorbent materials while contained within the trommel and while the trommel is rotating; and moving the absorbent materials out the downstream end of the trommel.

2. The method according to claim 1, further comprising the step of:

squeezing the absorbent materials to remove the oil from the absorbent materials prior to feeding into the trommel.

3. The method according to claim 1, further comprising the step of:

repacking the absorbent materials into recycled absorbent components for reuse in absorbing oil.

4. The method according to claim 1, further comprising the steps of:

providing a housing having an inlet for passing the absorbent materials into the forward end of the trommel and an outlet for passing the absorbent materials which move out of the downstream end of the trommel, the inlet and the outlet of the housing having gates for sealing pressure and treatment fluids within the housing, and the housing enclosing the trommel, with the trommel being rotatably mounted within the housing; and closing the gates of the outlet and inlet of the housing, sealing the pressure and treatment fluids within the housing while rotating the trommel and spraying treatment fluids on the absorbent materials within the trommel.

5. The method according to claim 1, wherein the absorbent materials are continuously tumbled in the trommel.

6. The method according to claim 1, wherein:

the absorbent materials are continuously tumbled in the trommel; and the treatment fluids and the heated air are sequentially applied to the absorbent materials within the trommel.

7. An apparatus for removing oil from absorbent materials of the type used for absorbing oil and containing oil spills, the apparatus comprising:

a housing having an inlet and an outlet for passing the absorbent materials therethrough;

a trommel having an open upstream end, an open downstream end, and a perforated wall defining an exterior for the trommel, the trommel further having a central axis which extends through a central portion of the trommel, wherein the trommel is rotatably mounted within the housing for receiving the absorbent materials into the central portion and rotating about the central axis;

feed means for feeding the absorbent materials into the inlet of the housing and through the upstream end of the trommel into the central portion of the trommel;

treatment means extending within the housing for spraying treatment fluids on the absorbent materials while in the trommel;

drive means for rotating the trommel about the central axis and tumbling the absorbent materials within the central portion of the trommel;

collection means extending beneath the trommel for collecting the treatment fluids and the oil which drain through the perforated wall of the trommel;

drying means for blowing heated air on the absorbent materials while contained within the trommel and while the trommel is rotating; and means for moving the absorbent materials out the open downstream end of the trommel and out the outlet of the housing.

8. The apparatus according to claim 7, further comprising:

a shredder for shredding the absorbent materials prior to entering the housing to reduce sizes for pieces of the absorbent materials.

9. The apparatus according to claim 7, further comprising:

a press for squeezing the absorbent materials prior to entering the housing to squeeze the oil from the absorbent materials.

10. The apparatus according to claim 7, further comprising:

a separator for receiving the treatment fluids and the oil from the collection trough, and separating the oil from the treatment fluids.

11. The apparatus according to claim 7, further comprising:

a shredder for shredding the absorbent materials prior to entering the housing to reduce sizes for pieces of the absorbent materials; and a press for squeezing the absorbent materials prior to entering the housing to squeeze the oil from the absorbent materials.

12. The apparatus according to claim 7, wherein the means for moving the absorbent materials out the open downstream end of the trommel comprises:

the trommel being canted within the housing to slope in a downward direction in extending from the open upstream end to the open downstream end, for continuously rotating and moving the absorbent materials within the trommel toward the open downstream end of the trommel; and wherein the housing further comprises gates mounted the housing at the inlet and the outlet of the housing for sealing pressure and treatment fluids within the housing.

13. An apparatus for removing oil from absorbent materials of the type used for absorbing oil and containing oil spills, the apparatus comprising:

a housing having an primary inlet and a primary outlet for passing the absorbent materials therethrough;

a trommel having an upstream end, a downstream end, an elongated tubular shape, a perforated wall defining an exterior for the trommel, and a longitudinal axis which extends through a central portion of the trommel, wherein the trommel is rotatably mounted within the housing for turning about the longitudinal axis and receiving the absorbent materials passing from the primary inlet of the housing;

feed means for urging the absorbent materials to move into the housing and through the upstream end of the trommel into the trommel;

spray means extending within the housing for applying treatment fluids to the absorbent materials while within the trommel;

a collection trough extending beneath the trommel for collecting the treatment fluids and the oil which drain through the perforated wall of the trommel;

drying means for blowing heated air onto the absorbent materials while in a downstream section of the trommel;

drive means for rotating the trommel about the longitudinal axis and tumbling the absorbent materials within the central portion of the trommel; and means for moving the absorbent materials out the downstream end of the trommel and out the primary outlet of the housing.

14. The apparatus according to claim 13, further comprising:

a shredder for shredding the absorbent materials prior to entering the housing to reduce sizes for pieces of the absorbent materials.

15. The apparatus according to claim 13, further comprising:

a press for squeezing the absorbent materials prior to entering the housing to squeeze the oil from the absorbent materials.

16. The apparatus according to claim 13, further comprising:

a separator for receiving the treatment fluids and the oil from the collection trough, and separating the oil from the treatment fluids.

17. The apparatus according to claim 13, further comprising:

a shredder for shredding the absorbent materials prior to entering the housing to reduce sizes for pieces of the absorbent materials; and a press for squeezing the absorbent materials prior to entering the housing to squeeze the oil from the absorbent materials.

18. The apparatus according to claim 13, further comprising:

a shredder for shredding the absorbent materials prior to entering the housing to reduce sizes for pieces of the absorbent materials;

a press for squeezing the absorbent materials prior to entering the housing to squeeze the oil from the absorbent materials; and a separator for receiving the treatment fluids and the oil from the collection trough, and separating the oil from the treatment fluids.

19. The apparatus according to claim 13, wherein the means for moving the absorbent materials out the downstream end of the trommel comprises:

the trommel being canted to slope in a downward direction in extending from the upstream end to the downstream end; and the trommel continuously rotating about the longitudinal axis for continuously moving the absorbent materials within the trommel from the upstream end toward the downstream end; and wherein the housing further comprises gates mounted the housing at the inlet and the outlet of the housing for sealing pressure and treatment fluids within the housing.

20. An apparatus for removing oil from absorbent materials of the type used for absorbing oil and containing oil spills, the apparatus comprising:

conveyance means for transporting the absorbent materials within the apparatus;

a press for squeezing the absorbent materials prior to entering the housing to squeeze the oil from the absorbent materials;

a shredder for shredding the absorbent materials prior to entering the housing to reduce sizes for pieces of the absorbent materials;

a housing having an primary inlet and a primary outlet for passing the absorbent materials therethrough;

hopper means for collecting absorbent materials and passing the absorbent materials through the primary inlet and into the housing;

a trommel having an upstream end, a downstream end, an elongated tubular shape, a perforated wall defining a exterior for the trommel, and a longitudinal axis which extends through a central portion of the trommel, the trommel concentrically and rotatably mounted within the housing for turning about the longitudinal axis of the trommel as the absorbent materials are passing through the central portion of the trommel;

an auger rotatably mounted within the housing and extending through the upstream end of the trommel for rotating about a central axis of the auger to urge the absorbent materials to move from the primary inlet of the housing and into the trommel;

spray means extending within the housing for spraying treatment fluids onto the absorbent materials while in the trommel;

collection trough extending beneath the trommel for collecting the treatment fluids and the oil which drain through the perforated wall of the trommel;

a separator for receiving the treatment fluids and the oil from the collection trough, and separating the oil from the treatment fluids;

drying means for blowing hot air onto the absorbent materials while in the trommel;

auger drive means for rotating the auger;

trommel drive means for continuously rotating the trommel; and wherein the trommel is canted to slope in a downward direction in extending from the upstream end to the downstream end, for continuously rotating and moving the absorbent materials within the trommel toward the downstream end of the trommel.

\* \* \* \* \*